US009561777B2

(12) United States Patent
Bell

(10) Patent No.: US 9,561,777 B2
(45) Date of Patent: Feb. 7, 2017

(54) SAFE BELT

(71) Applicant: Key Safety Systems, Inc., Sterling Heights, MI (US)

(72) Inventor: John Bell, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 14/647,687

(22) PCT Filed: Nov. 26, 2013

(86) PCT No.: PCT/US2013/071779
§ 371 (c)(1),
(2) Date: May 27, 2015

(87) PCT Pub. No.: WO2014/085358
PCT Pub. Date: Jun. 5, 2014

(65) Prior Publication Data
US 2016/0214565 A1    Jul. 28, 2016

Related U.S. Application Data

(60) Provisional application No. 61/730,732, filed on Nov. 28, 2012.

(51) Int. Cl.
| B60R 22/353 | (2006.01) |
| B60R 22/20 | (2006.01) |
| B60R 22/02 | (2006.01) |
| B60R 22/12 | (2006.01) |
| B60R 22/28 | (2006.01) |
| B60R 22/10 | (2006.01) |
| B60R 22/185 | (2006.01) |

(Continued)

(52) U.S. Cl.
CPC ............. *B60R 22/20* (2013.01); *B60R 22/024* (2013.01); *B60R 22/105* (2013.01); *B60R 22/12* (2013.01); *B60R 22/185* (2013.01); *B60R 22/26* (2013.01); *B60R 22/28* (2013.01); *B60R 22/353* (2013.01); *B60R 22/38* (2013.01); *B60R 2022/208* (2013.01); *B60R 2022/263* (2013.01); *B60R 2022/286* (2013.01)

(58) Field of Classification Search
CPC ....... B60R 22/024; B60R 22/20; B60R 22/353
See application file for complete search history.

(56) References Cited

U.S. PATENT DOCUMENTS 3,618,975 A * 11/1971 Bombach .............. B60R 22/023
 280/801.2
4,009,510 A *  3/1977 Lindblad ............. B60R 22/1855
 24/196

(Continued)

*Primary Examiner* — James English
(74) *Attorney, Agent, or Firm* — Markell Seitzman

(57) ABSTRACT

A vehicle seat belt system (20) has a seat belt webbing (22) which is attached to a tongue (30) that fastens into a buckle mechanism (6) fixed to a load bearing part of the vehicle. The belt system (20) has a seat belt retractor (40), a seat belt webbing (22) with a lap belt portion (23) appropriately anchored and shoulder harness portion (25), a self-adjustable webbing guide (65) and a vertical strap webbing (55). The self-adjusting webbing guide (65) includes a pivoting guide (66) connected to a locking mechanism (70) activated by a forward movement of the occupant (1, 100) extending the shoulder webbing (25).

20 Claims, 6 Drawing Sheets

(51) Int. Cl.
*B60R 22/38* (2006.01)
*B60R 22/26* (2006.01)

(56) References Cited

U.S. PATENT DOCUMENTS

| | | | | |
|---|---|---|---|---|
| 4,243,266 A * | 1/1981 | Anderson | ............... | B60R 22/30 297/468 |
| 5,716,102 A * | 2/1998 | Ray | .................. | B60R 22/26 242/384.4 |
| 6,068,340 A * | 5/2000 | Yano | ..................... | B60R 22/405 242/384.4 |
| 6,676,219 B1 * | 1/2004 | Brewer | ................ | B60R 22/023 297/483 |
| 7,954,901 B2 * | 6/2011 | Foye | ..................... | B60R 22/20 280/801.2 |
| 2003/0209899 A1 * | 11/2003 | Arnold | ................ | B60R 22/203 280/801.2 |
| 2008/0100051 A1 * | 5/2008 | Bell | ..................... | B60R 22/024 280/801.1 |
| 2008/0122214 A1 * | 5/2008 | Bell | ..................... | B60R 22/024 280/801.1 |
| 2009/0091115 A1 * | 4/2009 | Bell | ..................... | B60R 22/20 280/801.2 |
| 2012/0274120 A1 * | 11/2012 | Smith | .................... | B60R 22/19 297/468 |

\* cited by examiner

SAFE BELT

FIELD OF THE INVENTION

The present invention relates to a vehicle safety restraint, particularly a seat belt system that is suitable for restraining a child occupying a seat of a vehicle, but which can also be used for restraining adults.

BACKGROUND OF THE INVENTION

A conventional seat belt system comprises a length of seat belt webbing connected at three points to load-bearing parts of a vehicle. A lap portion of the seat belt webbing passes laterally across the hips of the seat occupant, and a torso portion of the seat belt webbing passes diagonally across the torso of the seated occupant from one hip to the opposite shoulder.

Typically one end of the seat belt webbing is attached to an anchor that is bolted to a load-bearing part of the vehicle on one side of the seat, usually to the seat or between the seat and an adjacent door. The shoulder end of the seat belt webbing is attached to a seat belt retractor mounted to a load-bearing part of the vehicle, for example a side pillar or sill, or directly to a load-bearing seat, optionally via a webbing guide.

The seat belt retractor increases comfort for the seat occupant restrained by the seat belt since it allows the seat belt webbing to pay out under relatively low loads to enable limited movement of the restrained seat occupant, for example to reach entertainment controls or storage compartments. The seat belt retractor is biased to keep the seat belt webbing relatively taut about the seat occupant. A locking element locks the seat belt retractor against webbing payout in the event an acceleration sensor senses a crash.

The seat belt webbing is fastened to the buckle mechanism by a buckle tongue that is slidably attached to the seat belt webbing so that the lengths of seat belt webbing making up the lap and torso portions can easily be varied to suit the size and shape of the vehicle occupant.

Known seat belt systems of this sort tend to be unsuitable for vehicle occupants of shorter than average stature, particularly for children, because the shoulder belt fastening point is located to accommodate an average person and is located at or above the height of the back of the seat. This is particularly so in rear seat safety restraints. Thus the torso portion of the seat belt tends to be badly positioned for a child or short person and usually passes too close or adjacent to the child's neck. Because the child does not fit into the adult seat belt properly, the child's shoulder can roll out of the seat belt during a crash effectively making the seat belt a two-point lap belt only. In this scenario, the lap portion alone will then take more force in a crash and will be more likely to inflict injuries than when a torso belt portion is combined with the lap portion. In addition, the child may slide under the lap portion; this is known as submarining. It is well known that children feel uncomfortable with adult seat belt restraints and often position the torso portion behind their back to reduce discomfort.

A solution to this problem is exemplified in a product known as "The Generation Belt" which provides an additional strap that is fastened taut in a generally vertical line along the front surface of the back of a vehicle seat. A shoulder support for the seat belt is slidably attached to the vertically extending strap so that its vertical position can be varied. However, the shoulder support is not retained in the desired position by anything other than friction and under high crash loads it may slide upwardly putting the shoulder support in an unsuitable position. "The Generation Belt" does not comply with the latest safety regulations of which at least one is ECE 44/03.

An alternative is to use a booster seat or cushion for a child user of an adult seat belt. However the lower mass of a typical child means insufficient force is generated during a crash for the seat belt to elongate as it would for an adult user. While the child's torso is firmly restrained, the head will swing forward to a greater extent than for an adult and will not satisfy the head injury criteria of standard safety regulations. Furthermore, the use of auxiliary child seats on public transportation, such as busses, is not always available.

In U.S. Pat. No. 7,703,806 B2 a vehicle seat belt system had seat belt webbing attached to a tongue adapted to be located in a buckle mechanism fixed to a load-bearing part of the vehicle. A generally vertically extending strap was adapted to be located in a position against a seat back. An adjustable webbing guide is connected to the generally vertically extending strap to the seat belt webbing; and there was a device for positively locking the webbing guide to the generally vertically extending strap at any one of a plurality of selectable locations on the generally vertically extending strap. A load limiter was operative for a child seat occupant but not operative for an adult seat occupant. The vertically extending strap was offered in distinguishable colors separated by a marker line to show the upper non-extensible portion of the strap and the lower extensible portion. This prior art device while an improvement was not automatic and required user intervention to insure it was properly fitted for the appropriate sized child. This introduced the concern that human error could occur and the wrong selection of selectable locations would be made. Secondarily, the vertical strap was positioned to be fully exposed in front of the exterior front surface of the seat back making it an obstruction against which adults would find objectionable.

It is therefore an object of the present invention to provide a fully automatic seat belt design with an automatic ability to adjust for different sized occupants without any manual adjustment or manipulation of the seat belt other than a normal fastening of the tongue to the buckle.

The present invention described below further achieves these objectives while concealing a large portion of a strap in or behind the seat back so the user cannot be impacted or confused by the exposure of extra straps as was the case in the prior art system of U.S. Pat. No. 7,703,806 B2.

These and other innovative features are disclosed by the seat belt system as described hereinafter.

SUMMARY OF THE INVENTION

A vehicle seat belt system has a seat belt webbing which is attached to a tongue that fastens into a buckle mechanism fixed to a load bearing part of the vehicle. The belt system has a seat belt retractor, a seat belt webbing with a lap belt portion appropriately anchored and shoulder harness portion and a self-adjusting webbing guide and a vertical strap webbing. The shoulder harness portion is connected at one end to the seat belt retractor. The seat belt webbing is releasably connected to the buckle mechanism at the tongue. The shoulder harness portion extends from the lap belt portion to an upper anchorage location. The vertical strap webbing extends from a lower portion located inside or behind a seat back extending upwardly to an intermediate location passing through a passageway or slot in the seat back and extending against the seat back passing through the webbing guide to an upper anchorage. The seat belt retractor is preferably located inside or behind the seat back at a location at least 450 mm above the vehicle seat. The shoulder webbing passes through an upper opening in the seat back to connect to the retractor. The self-adjusting webbing guide includes a pivoting guide connected to a locking mechanism activated by a forward movement of the occupant extending the shoulder harness webbing also referred to as shoulder webbing. The shoulder webbing portion is passed through an opening in the pivoting guide and is free to move relative to the pivoting guide. The locking mechanism is activated by the shoulder webbing pulling on the pivoting guide when the pivoting guide achieves a locking angle of 25 to 30 degrees relative to a vertical plane. The vertical strap webbing passes through the locking mechanism of the self-adjusting webbing guide and is free to slide relative to the locking mechanism until a locking angle occurs. The locking mechanism further has a rotatable wedge for gripping the vertical strap webbing upon locking. The rotatable wedge has a plurality of serrated teeth or edges for gripping the vertical strap webbing upon activation.

The vertical strap webbing at a lower end is attached to a shock absorbing mechanism such as a spring. The shock absorbing spring is attached to the seat frame. The shock absorbing spring has a length (l) in an unstretched condition. The shock absorbing spring stretches when the forward movement of the shoulder webbing moves the guide mechanism to a locking angle. The shock absorbing spring is preferably a coil spring made from wound wire of a length (x), however other mechanisms can be used. The coil spring stretches increasing the length (l) to maximum length of the wound wire (x) or less.

The self-adjusting webbing guide moves automatically in relation to a shoulder height of the occupant. The upper anchorage location is set at 450 mm above the seat and the range of movement of the self-adjusting guide is between a maximum of 488 mm for an adult occupant and 335 mm for a typical 3 year old occupant, the range of movement is automatically controlled by the occupant's shoulder height relative to the seat.

BRIEF DESCRIPTION OF THE DRAWINGS

The invention will be described by way of example and with reference to the accompanying drawings in which.

DETAILED DESCRIPTION OF THE INVENTION

Figure 1:
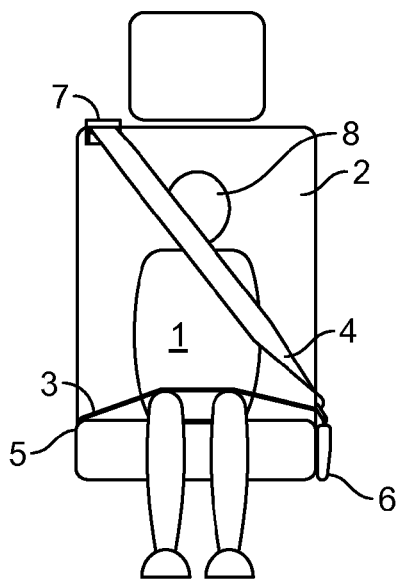
FIG. 1 is a schematic view of a small child restrained in a vehicle seat by a conventional prior art seat belt system.

FIG. 1 is a schematic view of a small child 1 restrained in a vehicle seat 2 by a prior art conventional seat belt system. The seat belt comprises a lap portion 3 and a torso portion 4. The seat belt is attached to load-bearing parts of the vehicle at three points: a lower fixing point 5 at one side of the seat, a buckle or buckle fixing point 6 at the opposite side of the seat and an upper fixing point 7 at the top of the seat back. As can be seen in FIG. 1, a conventional seat belt places the torso portion 4 in an unsuitable position for a child 1, since it would pass across the child's head 8 or neck.

Figure 2:
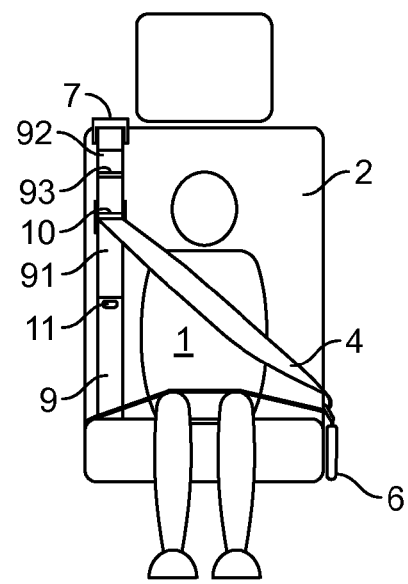
FIG. 2 is a schematic view of a small child restrained in a vehicle seat by a prior art seat belt system made in accordance to U.S. Pat. No. 7,703,806 B2.

In FIG. 2 a seat belt system according to the invention of prior art U.S. Pat. No. 7,703,806 B2 is illustrated when used for a small child 1 sitting in a vehicle seat 2. The inventive seat belt system comprises a generally vertically extending strap 9 attached to the seat 2 at an upper fixing point 7 and also at a lower fixing point, so that it extends in a generally vertical orientation against the seat back of the seat 2. The generally vertically extending strap has an upper non-extendable portion 92 and a lower extendable, for example elastic, portion 91. The two portions 91, 92 may be separated by a marker line 93 as shown or may be distinguished by different colors of the strap.

According to the preferred prior embodiment the lower extendable portion 91 has a different color or pattern compared to the upper portion, the lower extendable portion 91 extends over a height range which corresponds to a plurality of selectable locations which are suitable for attachment of the adjustable webbing guide for a child user of the restraint, and/or the upper non-extendable portion 93 extends over a height range which corresponds to a plurality of selectable locations which are suitable for attachment of the adjustable webbing guide for an adult user of the restraint. In this way the lower child portion of the generally vertically extending belt is easily identified so that an adult user can avoid attaching the webbing guide in the lower extendable portion 91, and a child user can avoid attaching the webbing guide in the non-extendable upper portion. For example the lower extendable portion could be a contrasting color relative to the other webbing. Alternatively marks could be made on the webbing at the boundary between the two portions.

An adjustable webbing guide 10 connects the torso portion 4 of the seat belt to the generally vertically extending strap 9, in the extendable portion 91, so as to lower the effective shoulder attachment point to a position ensuring the torso portion 4 of the seat belt is more correctly and safely positioned to extend from the hip to the opposite shoulder of a child 1 occupying a vehicle seat. The elastic nature of the extendable portion 91 also provides a load limiting effect to reduce the extent to which a child's head swings forward in a crash.

A raised stop 11, which may be in the form of a raised plastic protrusion on the generally vertically extending strap 9, prevents further movement of the adjustable webbing guide 10 below this point on the strap 9. The stop 11 will normally be positioned at the point that meets safety regulations or legal requirements for allowable seat occupant height. The stop 11 serves as an indicator of the minimum size of occupant that can use the restraint. If the adjuster is moved to the lowest position and the occupant's shoulder is below this level then the occupant is too small for the restraint and should use an appropriate child restraint such as a child seat.

Figure 3:
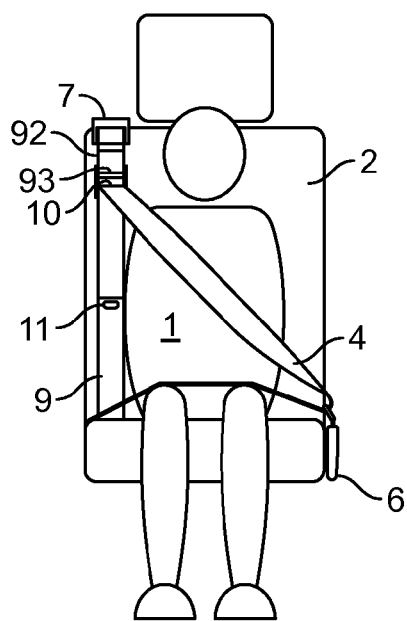
FIG. 3 is a schematic view of a larger child restrained in a vehicle seat by the prior art seat belt system of FIG. 2.

In FIG. 3 this prior seat belt system is shown with a slightly larger child 1 occupying the seat 2. The adjustable webbing guide 10 is mounted at a higher point on the extendable portion 91 of the generally vertically extending strap 9, again ensuring that the torso portion 4 of the seat belt suitably passes from the hip of the seat occupant to the opposite shoulder as illustrated.

Figure 4:
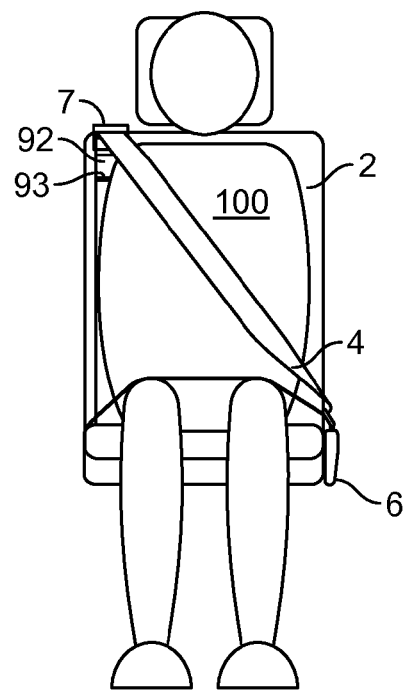
FIG. 4 is a schematic view of an adult restrained in a vehicle seat by the prior art seat belt system of FIG. 2.

In FIG. 4 an adult 100 occupies the seat 2 and in this case the adjustable webbing guide 10 is either removed altogether from the generally vertically extending strap 9 or is positioned at the non-extendable portion 92 of the generally vertically extending strap 9 so that the seat belt can be used as normal.

In the conventional seat belt shown in FIG. 1, the upper torso portion is unsuitable for children, but fine for adult users. In the prior art seat belt of U.S. Pat. No. 7,703,806 B2; the attempted solution requires user intervention to adjust the vertical webbing strap length to accommodate the size of the child to appropriately fit the wearer. This required selection and adjustment can lead to human errors.

The present invention as described as follows eliminates these issues by providing a seat belt system designed to automatically adjust to the size of the wearer from a full sized adult to a very small child.

With reference to FIGS. 5-8, the vehicle seat belt system 20 of the present invention is illustrated. The seat belt system 20 has a seat belt webbing 22 that is attached to a tongue 30 that fastens to a buckle mechanism 6 (shown in FIG. 1) fixed to a load bearing part of the seat or vehicle. The seat belt system 20 has a seat belt retractor 40, a seat belt webbing 22, a self-adjusting webbing guide 65, a vertical strap webbing 55, a tongue 30, an anchor 50 with an opening hole 52 for securing to a vehicle seat 2 and a shock absorbing adjustable spring 80 attached to an end of the vertical strap for securing to a back of a seat 2.

Figure 5:
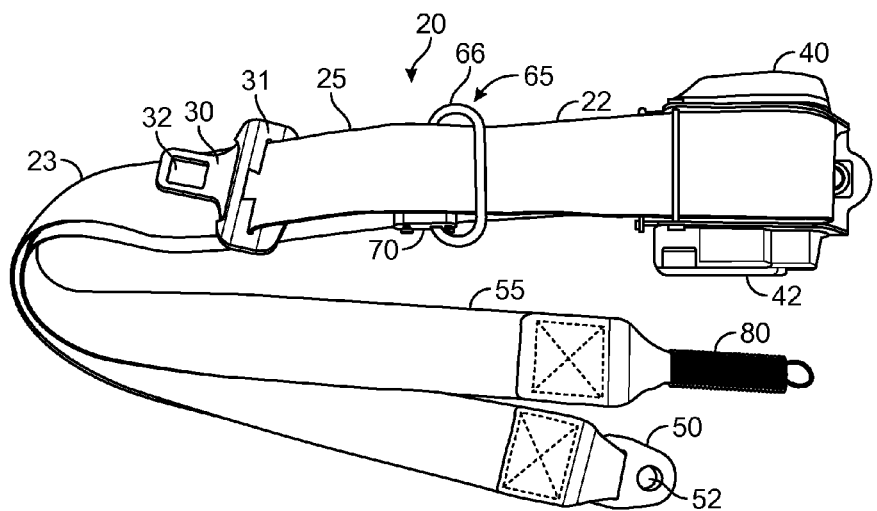
FIG. 5 is a view of the seat belt system of the present invention assembled, but not attached to a vehicle seat.

As illustrated in FIG. 5, the seat belt webbing 22 has a lap belt portion 23 and a shoulder harness portion 25. The lap belt portion 23 extends to the vehicle anchor 50 for securing the lap belt portion 23 to a load bearing part of the vehicle. The tongue 30 is shown with an opening 31 that allows it to slide vertically or along the length of the seat belt webbing 22. This tongue 30 is adapted to fit into a buckle mechanism that locks in the opening 32 of the tongue 30 to securely hold the seat belt webbing 22 securely about the occupant. As used here, the shoulder harness portion 25 is defined as that portion that will extend above the tongue 30 when the buckle mechanism is attached and the shoulder harness portion 25 is wrapped about a spool of the seat belt retractor 40 such that a length of this webbing 22 can be pulled out of the retractor 40 to extend the length of the entire webbing so that the occupant can easily secure and latch the tongue 30 into the buckle mechanism. This is conventional in most all seat belt systems currently used today. The lower portion of the seat belt webbing 22 extending from the tongue across the lap of the occupant is understand to be the lap belt portion 23 of the webbing 22 that is below the shoulder harness portion 25 of the webbing 22. This location of the upper portion and lower portion of the webbing 22 is defined by the positioning of the tongue 30 when it is latched into the buckle and varies dependent on the size of the occupant. Shown between the tongue 30 and the seat belt retractor 40 is a self-adjusting webbing guide 65. This webbing guide 65 has a pivoting guide 66 through which the shoulder harness portion 25 passes. This guide 66 is shown as a loop effectively of oval shape with a large opening which allows the shoulder harness to easily pass through. Under the pivot guide 66 of the webbing guide 65 is a locking mechanism 70, see FIG. 9A.

Figure 6:
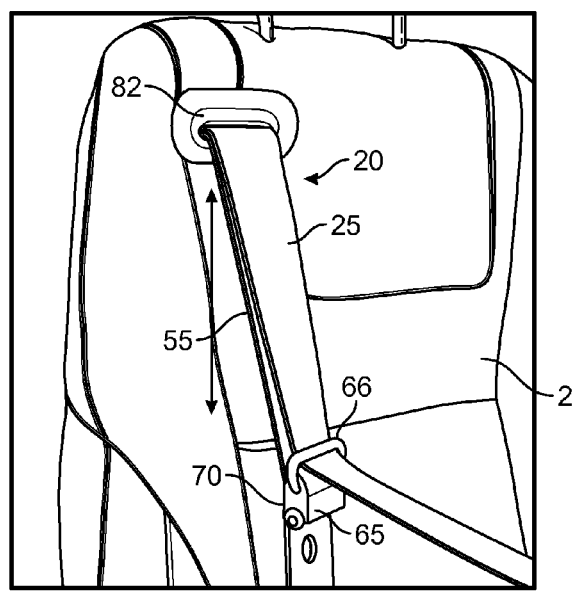
FIG. 6 is an upper front perspective view of the seat belt system assembled to a seat.
Figure 7:
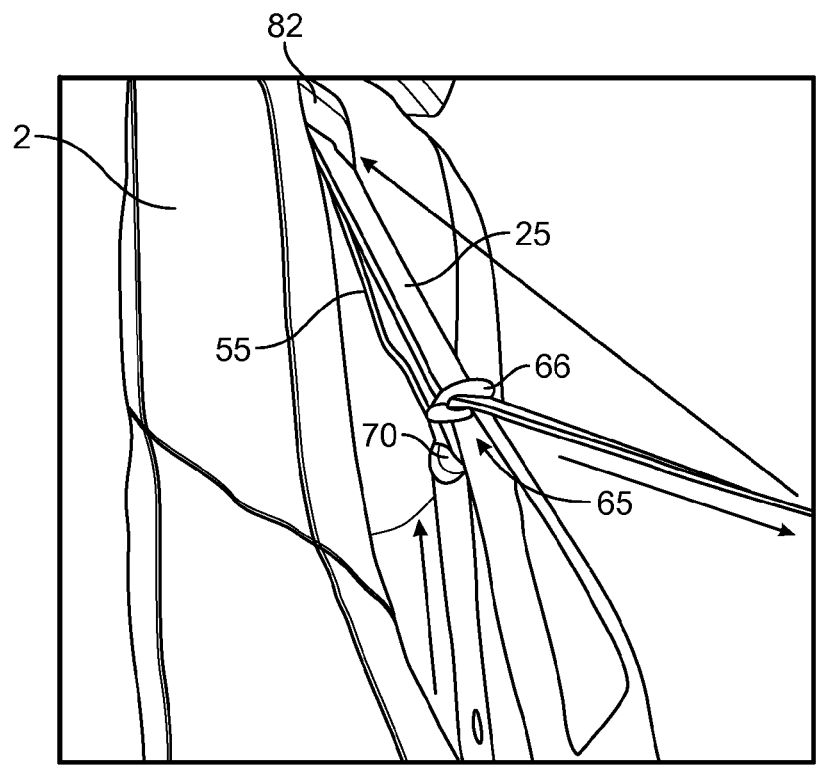
FIG. 7 is an upper side view of the seat belt and the seat.
Figure 9A:
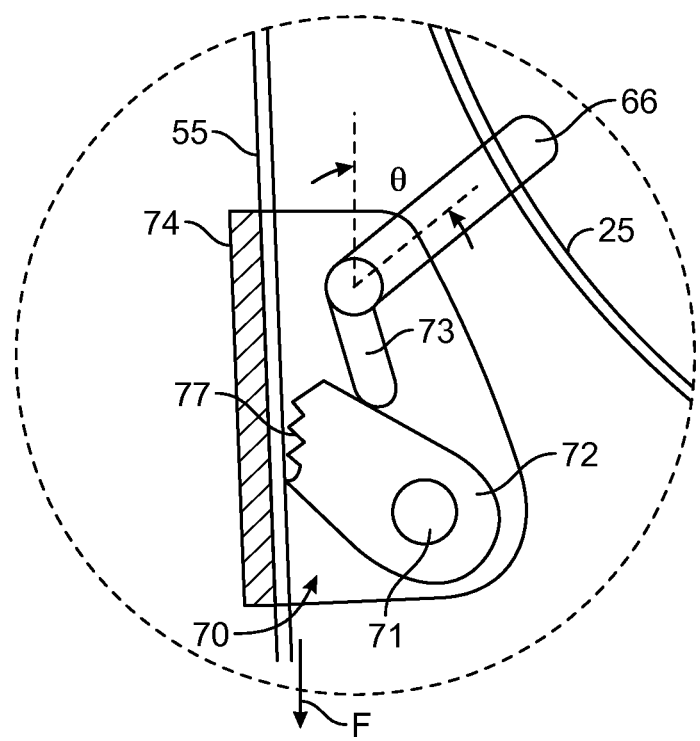
FIG. 9A is a schematic cross-sectional view of the self-adjustable webbing guide mechanism showing the locking angle.

This locking mechanism 70 is shown in FIG. 6 or 9A, and lies under the shoulder harness portion 25 and is pivotally connected to the pivoting guide 66 through which the shoulder harness portion 25 passes. Extending through the locking mechanism 70 is shown the vertically extending strap 55. This strap 55 is held vertically by a spring force F generated by the shock absorbing spring 80. The strap 55 is connected and passes through an opening in the locking mechanism 70 and is able to slide freely through the locking mechanism 70 when the locking mechanism 70 is in the unlocked position. This vertically extending strap 55 as shown in FIGS. 6, 7 and 9A extends to an opening 84 in the upper portion of the seat back 2. This vertical strap 55 along with the shoulder harness portion 25 is shown extending through this opening 84 and extending downward to a front portion of the seat back 2.

Figure 8:
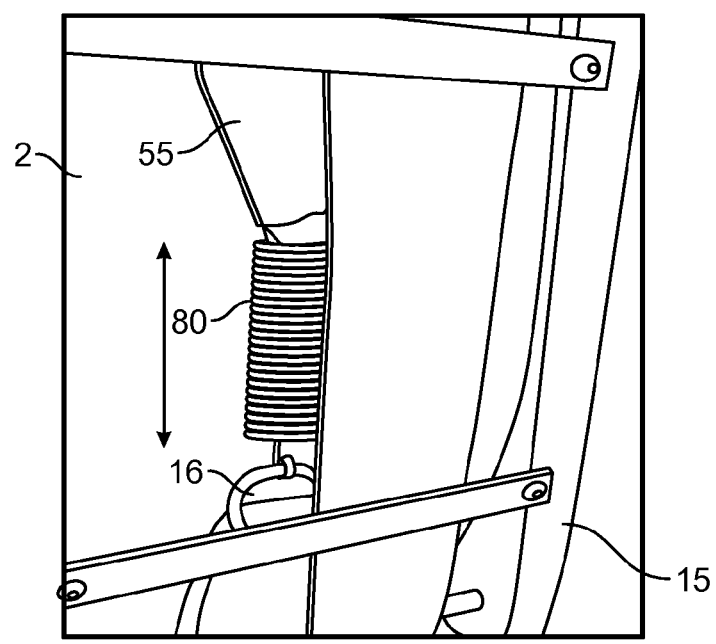
FIG. 8 is a rear view showing the vertical strap and shock absorbing mechanism attached to a seat frame.

With reference to FIG. 8, the back side of the seat back 2 is shown exposed without any cloth or covering. Inside this seat back frame structure 15 is shown the vertical strap 55 with a shock absorbing spring 80 fixed to a bracket 16 mounted on the seat frame 15. This shock absorbing spring 80 is illustrated extending substantially vertically along the back side of the seat back 2 and extending upwardly therefrom.

Figure 10:
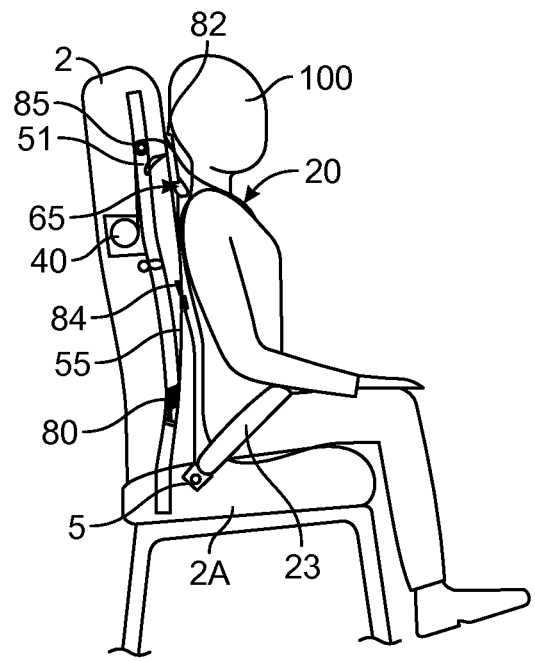
FIG. 10 is a side schematic view showing a full size adult fastened into the vehicle seat with the seat belt of the present invention.
Figure 11:
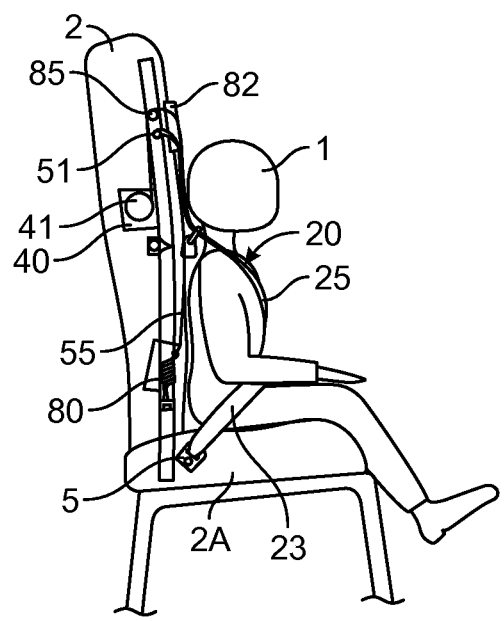
FIG. 11 is the side schematic view of FIG. 10 only with a small child secured in the vehicle seat.
Figure 12:
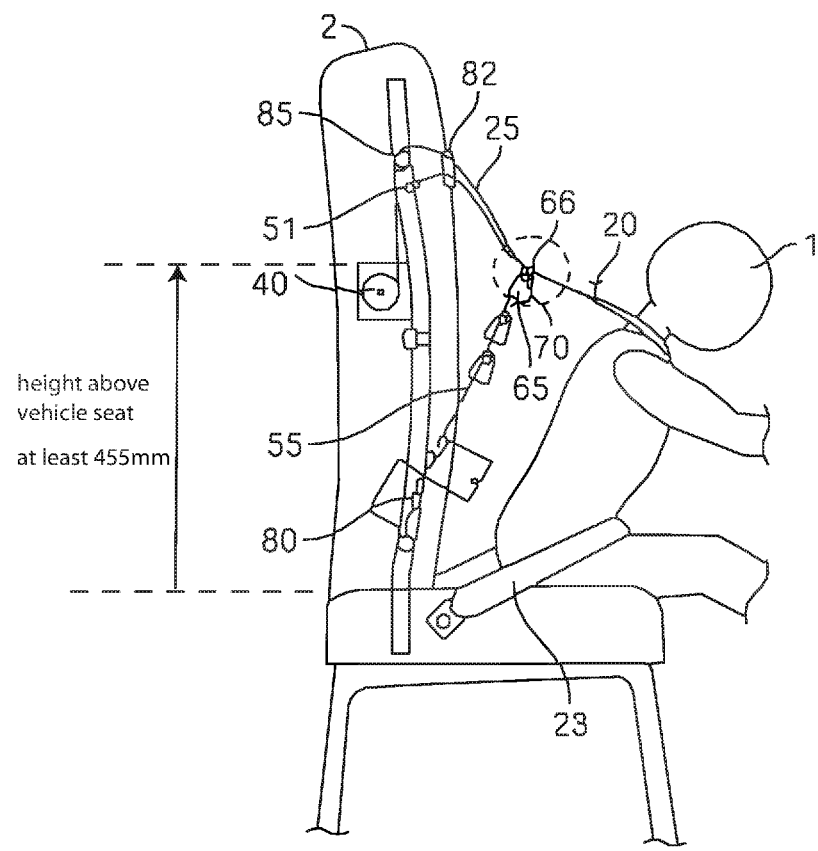
FIG. 12 is the side view of FIG. 11, but showing the child moving forwardly due to a rapid deceleration wherein the seat belt has the locking mechanism locked and the shock absorbing device of the vertical strap webbing stretched.

With reference to FIGS. 10-12, the entire seat belt assembly or system 20 is shown mounted on a vehicle seat 2 with occupants 1 or 100 sitting on the seat 2A. The distance from the top of the seat to where the seat belt retractor 40 is located is approximately 450 mm. In this illustrated embodiment, the seat belt retractor 40 is shown mounted to the back of the seat 2. It is understood that the seat belt retractor 40 could alternatively be provided in a pillar or some other location if so desired, however, by providing it in the seat back 2 it is possible to have the shoulder harness 25 extend from an upper opening 82 in the seat back 2 extending from the seat belt retractor 40 upward along the back side of the seat back 2 through the opening 82 and to extend outwardly therefrom. In this fashion the shoulder webbing 25 can be pulled to extend the length of the webbing 22 to allow for attachment of the tongue 30 to the seat belt buckle 6. As shown the lap belt portion 23 is shown wrapped around the waist of the occupant 1 or 100. In FIG. 10, an adult occupant 100 is shown wherein the seat belt assembly 20 is shown and the vertical strap 55 is shown extending from the shock absorbing spring 80 on the back side of the assembly 20 upwards along the seat back 2 and extending through an opening 84 about midway up the seat back 2. From this location, the rest of the vertical strap 55 extends upwardly to the self-adjusting webbing guide 65. At this point, the self-adjusting webbing guide 65 is located approximately at the shoulder height. Thereafter, the vertical strap 55 extends through the self-adjusting webbing guide locking mechanism 70, see FIG. 9A, and extends through the opening 82 downwardly to an upper anchorage location 41, as illustrated. This upper anchorage location 41 is secured to the frame 15 of the seat 2 and is the location where the top of the retractor 40 is positioned. The vertical webbing 55 also extends through the opening 84 to an anchor location 51 where the vertical strap 55 is physically secured.

Figure 9B:
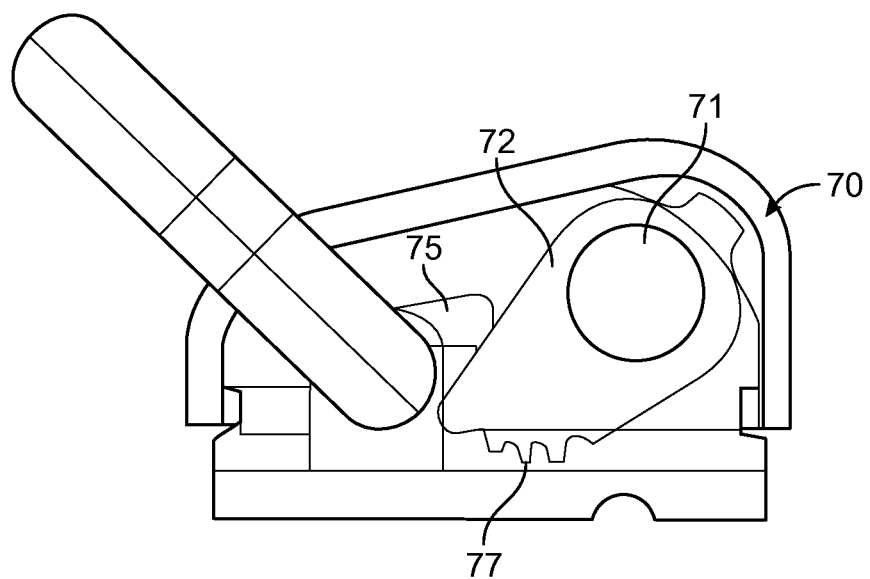
FIG. 9B is a plan cross-sectional view of the self-adjustable webbing guide mechanism.

As further illustrated in FIGS. 9A and 9B, the shoulder webbing 25 is shown going through the pivoting guide 66 in FIG. 9A and extending therethrough. A locking angle θ of 25 to 30 degrees is required to move this pivoting guide 66 in such a fashion that when it is pulled by the shoulder harness 25 it causes a rotation of a lever 75 that pushes against the locking wedge 72 of a locking mechanism 70. The locking mechanism 70 has the rotatable wedge 72 secured by a pivot 71 as illustrated. A lightly loaded biasing spring can be used in the pivot 71 to maintain the locking wedge 72 always biased open until the locking angle is reached to rotate the locking wedge 72 into a locked condition. The rotatable wedge 72 preferably has means such as teeth 77 for gripping the vertical strap when the locking wedge is rotated into the locked position. As illustrated, the vertical strap 55 is shown secured between the wedge 72 and the locking mechanism body structure 74 and as such the locking mechanism body structure 74 and the rotatable wedge 72 allow the strap 55 to move freely up and down along the self-adjusting webbing guide 65. This feature is important in that as the webbing guide 65 moves in relation to the size of the occupant 1 or 100. The entire webbing guide 65 is designed to move freely down the webbing 22 due to its weight under the influence of gravity and pulling on the shoulder harness moves the device upwardly when placing the belt on. As shown in FIG. 10, the webbing guide 65 is positioned slightly above the shoulder of the adult occupant 100. In FIG. 11, a small child 1 is shown seated on the vehicle seat 2, 2A. In this position, the webbing guide 65 is positioned at the shoulder of the small child 1. As the small child 1 sits in the seat 2, 2A and has pulled the shoulder harness 25 into the buckle latching mechanism 6 (not shown in FIGS. 10-12), the webbing guide 65 automatically slides or adjusts down to the height of the small child's shoulder. This feature enables the entire assembly to automatically adjust for the size of the different vehicle seat occupants. The pivoting guide 66 is shown mounted in a opening 73. The opening 73 allows the entire assembly 65 to rotate when the shoulder harness 25 is pulled forward. This is illustrated in FIG. 12 wherein the child 1 is moved forward during a rapid deceleration. At this point, the rotatable wedge 72 will rotate in the direction indicated thereby closing the gap between the guide mechanism housing 74 and the wedge 72. The serrated teeth 77 on the rotatable wedge 72 help bite into webbing guide and lock it in position. At this point, the occupant 1 and the vertical strap 55 are now fixed from movement relative to the guide 65 as the child 1 propels forward during the rapid deceleration of the vehicle the webbing guide assembly 65 is now locked on the shoulder harness 25 at a fixed location as is the vertical strap 55. At this point the shock absorbing spring 80 stretches increasing the spring force F applied to the vertical strap 55. The spring 80 as illustrated had a length of (l) in the unrestrained and unloaded position. As the occupant 1 propels forward, the spring 80 is stretched. The spring 80 can stretch only to the maximum length of the wire used to make the coil 80. This stretching creates a load limiting effect on the occupant 1 such that as the child 1 propels forward the spring 80 will take or absorb some of the load and absorb the kinetic energy in such a fashion that the child 1 while being properly fitted about shoulder and upper torso area by the shoulder harness 25 will have the energy absorbed so that he can move forward. This greatly reduces the strain and load on the neck and head of the occupant 1.

The dynamic sequence of the occupant during a rapid deceleration is indicated by the following sequence. 1. Deceleration starts—retractor vs locks. 2. Dummy starts moving with respect to seat. Small webbing payout until spool is locked by vs. 3. Webbing payout due to cinch and elongation while dummy is being decelerated by belt. 4. Activation guide locks the height adjuster against the back webbing. 5. Back webbing pulls extension spring, which elongates and the load the back webbing bears is therefore limited.

It is believed important that the shoulder height of the adult male occupant is positioned about 488 mm as a maximum as measured from the top of the seat cushion 2A to the top of the occupant's shoulder. This provides for the adult male. At 479 mm the adult female is typically accommodated at this height well within the maximum distance above the seat bottom or cushion 2A. This shoulder height is positioned slightly above the retractor assembly 40 shown in FIG. 10 which is positioned at 450 mm above the top of the seat cushion 2A which is the recommended minimum distance for effective upper anchorage under the current rules of ECE-R14. With regard to the child 1, this 450 mm location of the upper anchorage allows for a six year old shoulder height of approximately 452 mm above the top of the seat cushion 2A all the way down to a 3 year old child having a 338 mm distance between the shoulder and the top of the seat cushion 2A of the seat 2, as illustrated. This allows for a range of occupants from 3 years to full size adults to be able to use the seat without any other alterations or manual manipulations. The seat belt system 20 when employed, will automatically adjust to the person's height and seat location.

Due to the fact that a large portion of the vertical strap webbing 55 is positioned behind the seat 2, the occupant is not confused by a multitude of straps, he simply puts the shoulder belt 25 on as one would normally apply any conventional seat belt and the belt system 20 will work automatically. This ensures that there are not adjustments needed or manipulations required by the user. The seat belt 20 automatically positions itself above the shoulder as required.

The advantage of the seat belt system 20 according to this invention is improved safety by positioning correctly the seat belt relative to the occupant avoids the belt from being too far from the shoulder. This seat belt system 20 improves comfort because it avoids the belt from being too close to the neck of an occupant regardless of their size. Furthermore, the seat belt reduces seat belt misuse due to discomfort. The two point configuration whereby a child will put a shoulder harness behind his back in order to insure that the shoulder harness portion does not get too close to the neck. Under the present invention, the seat belt 20 fits properly for children from children ages 3 years up to full size adults. This ensures that there is no need to improperly manipulate the shoulder harness as it will fit comfortably on all size occupants in this age range. The important aspect is that the seat belt adjusts to fit all occupant sizes. The seat belt further assists in rollover protection because the occupant is known to be properly secured when wearing this type of seat belt assembly.

In certain applications, it has been determined that taxis, minivans, buses, large buses and coaches can utilize this system because it can be incorporated directly into the seat structure as illustrated and can be secured into the seat frame. Therefore, the system can be easily incorporated. This solves many problems for toddlers and small children in that they will not be required to sit in a toddler seat or any other adaptive configuration provided in a vehicle seat because the seat belt system can allow the child to safely sit in any standard seat when this seat belt system is employed.

The seat belt 20 is designed to transfer the load back to the upper anchorage without any slippage. The unique shock absorbing mechanism 80 in the back strap allows the occupants upper body to move forward by a controlled force directing the load from the guide mechanism 65 back to the upper anchorage. While it is recognized that the seat belt retractor 40 can be positioned inside the seat back, it is understood that it should be possible for the seat belt retractor 40 to be positioned in a side pillar along with the vertical strap 55 if so desired. Under such a positioning (not illustrated), all the functioning of the seat belt assembly 20 will be similar to that of a conventional vehicle, however the location of the retractor 40 can be adjusted to fit alternatively from the back of the seat into other positions as long as the engineering dimensions are maintained such that the upper anchorage location and the range of movement between the upper anchorage location and the shoulder of the occupant is maintained such that a proper adjustment for different sized occupants can be achieved as illustrated in the preferred embodiment. An important aspect of the present invention is illustrated in FIGS. 10-12 as both the shoulder harness 25 and the vertical strap webbing 55 pass through an upper opening 82 in the seat back 2. The shoulder harness 25 is passed over a roller end 85 in the seat frame 15 and then is directed downwardly to the seat belt retractor 40 in such a fashion that the retractor 40 provides a downward biasing load on the shoulder harness 25 during use so that the fitment will be proper. The vertical strap webbing 55 is anchored at fastener 51 securely to the frame 15 inside the upper opening 82 as illustrated. This provides a secure attachment at that end of the vertical strap 55 such that it is secured and the guide mechanism 65 can freely slide about the shoulder harness 25 and the vertical strap 55 to fit the proper occupant directly above the shoulder location as illustrated. It is understood that these different variations can be used with regard to the device. However it is important to understand that the device is adapted to provide a secure and safe means of holding occupants of various sizes.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vehicle seat belt system (20) having a seat belt webbing (22) which is attached to a tongue (30) that fastens into a buckle mechanism (6) fixed to a load bearing part of the vehicle; the belt system (20) comprising:
    a seat belt retractor (40);
    a seat belt webbing (22) having a lap belt portion (23) and a shoulder harness portion (25), the lap belt portion (23) appropriately anchored and the shoulder harness portion (25) connected at one end to the seat belt retractor (40), the seat belt webbing (22) releasably connected to the buckle mechanism (6) at the tongue (30) and extending to an upper anchorage location (41);
    a self-adjusting webbing guide (65); and
    a vertical strap webbing (55) extending from a lower portion located inside or behind a seat back (2) extending upwardly to an intermediate location passing through a passageway or slot (84) in the seat back (2) and extending against the seat back (2) passing through the webbing guide (65) to an upper anchorage (41);
    wherein the self-adjusting webbing guide (65) includes a pivoting guide formed in the shape of a loop forming an opening, the loop rotates under load from the shoulder webbing, the loop is connected to an actuating lever (75) which is part of locking mechanism (70) activated by a forward movement of the occupant extending the shoulder webbing (25) which in turn rotates the loop which moves the actuating lever, and wherein the shoulder webbing is free to move relative to the loop.

2. The vehicle seat belt system (20) of claim 1 wherein the seat belt retractor (40) is located inside or behind the seat back (2) at a location at least 450 mm above the vehicle seat bottom and wherein the shoulder webbing (25) passes through an upper opening (82) in the seat back (2) to connect to the retractor (40).

3. The vehicle seat belt system (20) of claim 2 wherein the locking mechanism (70) is activated by the shoulder webbing (25) pulling on the pivoting guide (66) when the pivoting guide (66) achieves a locking angle of 25 to 30 degrees relative to a vertical plane.

4. The vehicle seat belt system (20) of claim 3 wherein the vertical strap webbing (55) passes through the locking mechanism (70) of the self-adjusting webbing guide (65) and is free to slide relative to the locking mechanism (70) until a locking angle occurs.

5. The vehicle seat belt system (20) of claim 4 wherein the locking mechanism (70) further has a rotatable wedge (72) for gripping the vertical strap webbing (55) upon locking.

6. The vehicle seat belt system (20) of claim 5 wherein the rotatable wedge (72) has a plurality of serrated teeth or edges (77) for gripping the vertical strap webbing (55) upon activation.

7. The vehicle seat belt system (20) of claim 6 wherein the vertical strap webbing (55) at a lower end is attached to a shock absorbing spring (80), the shock absorbing spring (80) being attached to the seat frame (2).

8. The vehicle seat belt system (20) of claim 7 wherein the shock absorbing spring (80) has a length ($l$) in an unstretched condition.

9. The vehicle seat belt system (20) of claim 8 wherein the shock absorbing spring (80) stretches when the forward movement of the shoulder webbing (25) moves the guide mechanism (65) to a locking angle.

10. The vehicle seat belt system (20) of claim 9 wherein the shock absorbing spring (80) is a coil spring made from wound wire of a length ($x$).

11. The vehicle seat belt system (20) of claim 1 wherein the self-adjusting webbing guide (65) moves automatically in relation to a shoulder height of the occupant.

12. The vehicle seat belt system (20) of claim 1 wherein the upper anchorage location (82) is set at 450 mm above the seat (2) and the range of movement of the self-adjusting guide (65) is between a maximum of 488 mm for an adult occupant and 335 mm for a typical 3 year old occupant, the range of movement being automatically controlled by the occupant's shoulder height relative to the seat (2).

13. A vehicle seat belt system (20) having a seat belt webbing (22) which is attached to a tongue (30) that fastens into a buckle mechanism (6) fixed to a load bearing part of the vehicle; the belt system (20) comprising:
    a seat belt retractor (40);
    a seat belt webbing (22) having a lap belt portion (23) and a shoulder harness portion (25), the lap belt portion (23)

appropriately anchored and the shoulder harness portion (25) connected at one end to the seat belt retractor (40), the seat belt webbing (22) releasably connected to the buckle mechanism (6) at the tongue (30) and extending to an upper anchorage location (41);

a self-adjusting webbing guide (65);

a vertical strap webbing (55) extending from a lower portion located inside or behind a seat back (2) extending upwardly to an intermediate location passing through a passageway or slot (84) in the seat back (2) and extending against the seat back (2) passing through the webbing guide (65) to an upper anchorage (41);

wherein the seat belt retractor (40) is located inside or behind the seat back (2) at a location at least 450 mm above the vehicle seat and wherein the shoulder webbing (25) passes through an upper opening (82) in the seat back (2) to connect to the retractor (40);

wherein the self-adjusting webbing guide (65) includes a pivoting guide (66) connected to a locking mechanism (70) activated by a forward movement of the occupant extending the shoulder webbing (25), the shoulder webbing (25) being passed through an opening in the pivoting guide (65) and free to move relative to the pivoting guide (66);

wherein the locking mechanism (70) is activated by the shoulder webbing (25) pulling on the pivoting guide (66);

wherein the vertical strap webbing (55) passes through the locking mechanism (70) of the self-adjusting webbing guide (65);

wherein the locking mechanism (70) further has a rotatable wedge (72) for gripping the vertical strap webbing (55) upon locking;

wherein the rotatable wedge (72) has a plurality of serrated teeth or edges (77) for gripping the vertical strap webbing (55) upon activation;

wherein the vertical strap webbing (55) at a lower end is attached to a shock absorbing spring (80), the shock absorbing spring (80) being attached to the seat frame (2);

wherein the shock absorbing spring (80) has a length (1) in an unstretched condition wherein the shock absorbing spring (80) stretches when the forward movement of the shoulder webbing (25) moves the guide mechanism (65) to a locking angle, wherein the shock absorbing spring (80) is a coil spring made from wound wire of a length (x)

wherein the coil spring (80) stretches increasing the length (1) to maximum length of the wound wire (x) or less.

14. A vehicle seat belt system (20) having a seat belt webbing (22) which is attached to a tongue (30) that fastens into a buckle mechanism (6) fixed to a load bearing part of the vehicle; the belt system (20) comprising:

a seat belt retractor (40);

a seat belt webbing (22) having a lap belt portion (23) and a shoulder harness portion (25), the lap belt portion (22) appropriately anchored and the shoulder harness portion (25) connected at one end to the seat belt retractor (40), the seat belt webbing (22) releasably connected to the buckle mechanism (6) at the tongue (30) and extending to an upper anchorage location (41);

a self-adjusting webbing guide (65) having a rotable loop forming an opening, the loop extending away from the webbing guide, wherein the self-adjusting web guide (65) moves automatically in relation to a shoulder height of the occupant (1, 100); and a vertical strap webbing (55) extending from a lower portion located inside or behind a seat back (2) extending upwardly to an intermediate location passing through a passageway or slot (84) in the seat back (2) and extending against the seat back (2) passing through the webbing guide (65) to an upper anchorage (41).

15. The vehicle seat belt system (20) of claim 14 wherein the upper anchorage location (41) is set at 450 mm above the vehicle seat bottom and the range of movement of the self-adjusting guide (65) is between a maximum of 488 mm for an adult occupant and 335 mm for a typical 3 year old occupant, the range of movement being automatically controlled by the occupant's shoulder height relative to the seat.

16. A vehicle seat belt system (20) having a seat belt webbing (22) which is attached to a tongue (30) that fastens into a buckle mechanism (6) fixed to a load bearing part of the vehicle; the belt system (20) comprising:

a seat belt retractor (40);

a seat belt webbing (22) having a lap belt portion (23) and a shoulder harness portion (25), the lap belt portion (23) appropriately anchored and the shoulder harness portion (25) connected at one end to the seat belt retractor (40), the seat belt webbing (22) releasably connected to the buckle mechanism (6) at the tongue (30) and extending to an upper anchorage location (41);

a self-adjusting webbing guide (65);

a vertical strap webbing (55) extending from a lower portion located inside or behind a seat back (2) extending upwardly to an intermediate location passing through a passageway or slot in the seat back (2) and extending against the seat back (2) passing through the webbing guide (65) to an upper anchorage (41); and a shock absorbing spring (80) wherein the vertical strap webbing (55) at a lower end is directly attached to the shock absorbing spring (80), the shock absorbing spring (80) being attached to the seat frame (15).

17. The vehicle seat belt system (20) of claim 16 wherein the shock absorbing spring (80) has a length (1) in an unstretched condition.

18. The vehicle seat belt system (20) of claim 17 wherein the shock absorbing spring (80) stretches when the forward movement of the shoulder webbing (25) moves the guide mechanism (65) to a locking angle.

19. The vehicle seat belt system (20) of claim 18 wherein the shock absorbing spring (80) is a coil spring made from wound wire of a length (x).

20. A vehicle seat belt system (20) having a seat belt webbing (22) which is attached to a tongue (30) that fastens into a buckle mechanism (6) fixed to a load bearing part of the vehicle; the belt system (20) comprising:

a seat belt retractor (40);

a seat belt webbing (22) having a lap belt portion (23) and a shoulder harness portion (25), the lap belt portion (23) appropriately anchored and the shoulder harness portion (25) connected at one end to the seat belt retractor (40), the seat belt webbing (22) releasably connected to the buckle mechanism (6) at the tongue (30) and extending to an upper anchorage location (41);

a self-adjusting webbing guide (65);

a vertical strap webbing (55) extending from a lower portion located inside or behind a seat back (2) extending upwardly to an intermediate location passing through a passageway or slot in the seat back (2) and extending against the seat back (2) passing through the webbing guide (65) to an upper anchorage (41);

a shock absorbing spring (80) wherein the vertical strap webbing (55) at a lower end is attached to the shock absorbing spring (80), the shock absorbing spring (80) being attached to the seat frame (15);

wherein the shock absorbing spring (80) is a coil spring made from wound wire of a length (x);

wherein the coil spring (80) stretches increasing the length (l) to maximum length of the wound wire (x) or less.

\* \* \* \* \*